Patented Apr. 30, 1968

3,380,918
ARYL NITROSO COMPOUNDS AS
LUBRICANT ADDITIVES
Donald J. Anderson, San Anselmo, Calif., assignor to Chevron Research Company, San Francisco, Calif., a corporation of Delaware
No Drawing. Filed Mar. 25, 1966, Ser. No. 537,295
4 Claims. (Cl. 252—51.5)

ABSTRACT OF THE DISCLOSURE

Lubricating oil additives prepared by contacting at elevated temperatures an aryl C-nitroso compound of from 6 to 12 carbon atoms with a terminal aliphatic hydrocarbon olefin of from about 30 to 200 carbon atoms.

---

This invention concerns novel nitrogen and oxygen containing organic compounds which find use as detergents in lubricating oils. More particularly, this invention concerns novel nitrogen and oxygen compositions derived from nitroso compounds which find use as detergents in lubricating oils.

A development of major importance in the lubricating oil additive field has been the introduction of ashless detergents, that is, metal free compounds which are capable of reducing varnish and sludge deposits in internal combustion engines. An important advantage of these ashless detergents is the avoidance of the ash formed by the metal salt detergents on decomposition. Thus, valve and combustion chamber deposition with accompanying octane requirement increase can be minimized through the use of ashless detergents.

This invention concerns the reaction product of aryl C-nitroso compounds and a terminal olefin of from about 30 to 200 carbon atoms, prepared by combining the aryl C-nitroso compound with the terminal olefin at a temperature in the range of about 150° to 300° C. for a time in the range of about 1 to 24 hours and then isolating the resulting product.

By analogy to the reaction of 1,1-diphenyl ethylene and para-nitrosodimethylaniline (Lapworth et al., J. Chem. Soc., 2458 (1925)), the product of this invention could be a nitrone:

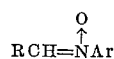

wherein R is an aliphatic hydrocarbon group of from about 28 to 298 carbon atoms and Ar is an aryl group.

The nitroso compound used to prepare the products of this invention will be considered first. The nitroso compound will have a carbocyclic ring of from 6 to 10 anular carbon atoms and a total of from about 6 to 12 carbon atoms. The ring may be substituted by lower alkyl groups, and mono- and di(lower alkyl)amino groups. (Lower alkyl is of from 1 to 6 carbon atoms.)

Illustrative nitroso compounds include nitrosobenzene, nitrosotoluene, nitroso(tert. - butyl)benzene, nitrosomethylaniline, nitrosopropylaniline, nitrosodimethylaniline, nitrosodipropylaniline, etc.

The olefin used in this invention is most conveniently prepared by polymerizing a low molecular weight olefin of from about 2 to 6 carbon atoms. Illustrative olefins include ethylene, propylene, isobutylene, butene-1, 4-methylpentene-1, hexene-1, etc. The olefins may be used singly or in combination. The method of polymerization is not critical to this invention, any convenient method providing the desired molecular weight being satisfactory.

The mole ratios of the materials may be varied widely, generally being in the range of about 1–10:10–1. However, it is generally preferred to use from about 1 to 2 moles of the olefin to about 1 mole of the nitroso compound.

The reaction is simply carried out by combining the two reactants and heating at a temperature in the range of about 150° to 300° C., more usually in the range of about 180° to 250° C. It may be convenient in certain instances to combine the materials in an inert medium, e.g., chloroform, hydrocarbonaceous oil, low molecular weight aromatic hydrocarbons, etc. When the reactants are thoroughly intermixed, the inert medium may be distilled off or retained if it is stable at the reaction temperatures and has a boiling point above the reaction temperature.

The time for the reaction is temperature dependent and will generally range from about 1 to 24 hours, more usually from about 4 to 12 hours. Excessive reaction time should be avoided since this may lead to changes in the structure of the product, as well as some degradation.

As already indicated, the reaction may be carried out neat or in the presence of an inert medium. Usually, since the reaction proceeds quite satisfactorily in the absence of a solvent, no solvent is used. However, in particular instances an inert diluent may be desired and to that degree, inert diluents may be added. In such instances, the concentration of reactants employed will depend on the rate of reaction desired: the rate of reaction is at least a second order reaction and therefore concentration dependent. The inert medium should be chosen so as to permit easy separation or be a material in which the product is to be used, e.g., hydrocarbonaceous oil.

Usually, the reaction will be carried out in an inert atmosphere: that is, in the absence of oxygen. Various inert bases may be used, such as nitrogen, helium, etc.

At the completion of the reaction, the reaction mixture is cooled and the product isolated. This requires removing any unreacted reactants. Even this separation may be avoided, by using an approximately 1:1 ratio of the reactants.

The following examples are offered by way of illustration and not by way of limitation.

EXAMPLE I

Into a reaction flask was introduced 6.5 g. (0.043 mole) of para-nitrosodimethylaniline and 54.2 g. (0.054 mole) of polyisobutylene, the mixture diluted with 200 ml. chloroform and nitrogen passed over the solution. The chloroform was then distilled off and the temperature raised to 180° C. and maintained there for 6 hours while maintaining an atmosphere of nitrogen. At the end of this time, the reaction mixture was cooled, diluted with hexane, filtered and the hexane removed in vacuo. Analysis: Percent N, 1.16, 1.20.

EXAMPLE II

Into a reaction flask was introduced 7.5 g. (0.05 mole) of para-nitrosodimethylaniline and 25 g. (0.063 mole) of polyisobutylene, and the mixture diluted with 200 ml. chloroform. After blowing nitrogen over the reaction mixture, the mixture was heated to reflux and the chloroform distilled off. The temperature was then raised to 180° C. and maintained for 6 hours. At the end of this time, the reaction mixture was cooled, diluted with hexane, filtered and the hexane removed in vacuo. Analysis: Percent N, 2.76, 2.80.

EXAMPLE III

Into a reaction flask was introduced 300 g. (2 moles) of para-nitrosodimethylaniline and 900 g. (1 mole) of polyisobutylene and the mixture heated to 200° C. with stirring. The exothermicity of the reaction caused the temperature to rise to 220° C., and external heating was stopped. When the temperature dropped to 200° C., that temperature was maintained by external heating for 6 hours.

The mixture was then diluted with 1.5 liters of pentane, transferred to a separatory funnel and an attempt made to extract the mixture with 10 percent concentrated hydrochloric acid. However, the aqueous phase mixed with the organic phase. This resultant phase was washed with concentrated caustic and then water until neutral to pH paper. The pentane was distilled off, the mixture diluted with benzene and the water azeotroped off with the benzene by heating the mixture to a temperature of about 120°–130° C. and bubbling nitrogen through the mixture. Analysis: Percent N, 2.28, 2.31.

An aliquot of the above material was extracted with ether and the ether soluble fraction isolated. Analysis: Percent N, 1.01, 1.06.

As already indicated, the compounds of this invention find use as dispersants and detergents in lubricating oils. When compounded with a lubricating oil for use in an engine, the compounds of this invention will be present in at least about 1 weight percent and usually not more than 20 weight percent, more usually in the range of about 1.5 to 15 weight percent.

The compounds, however, can be prepared as concentrates, due to their excellent compatibility with oils. As concentrates, the compounds of this invention will generally range from about 20 to 70 weight percent of the total composition.

The lubricating fluids (hereinafter referred to as oils) which may be used with the compounds of this invention can be derived from natural or synthetic sources. Oils generally have viscosities of from about 35 to 50,000 Saybolt Universal Seconds (SUS) at 100° F. Among natural hydrocarbonaceous oils are paraffin base, naphthenic base, asphaltic base and mixed base oils. Illustrative of synthetic oils are: hydrocarbon oils, such as polymers of various olefins; and alkylated aromatic hydrocarbons; and non-hydrocarbon oils, such as polyalkylene oxide, aromatic ethers, carboxylate esters, phosphate esters and silicon esters. The preferred media are the hydrocarbonaceous media, both natural and synthetic.

The above oils may be used individually or together whenever miscible or made so by the use of mutual solvents.

Usually included in the oils are other additives, such as extreme pressure agents, rust inhibitors, antioxidants, oiliness agents, foam inhibitors, viscosity index improvers, pour point depressants and occasionally other detergents. Usually, these will be present in the range from about 0.01 to 10 weight percent, more usually from about 0.5 to 5 weight percent of the composition; generally, each of the additives will be present in the range from about 0.01 to 5 weight percent of the composition.

A preferred aspect in using the compounds of this invention in lubricating oils is to include in the oil from about 1 to 50 mM./kg. of an O,O-dihydrocarbyl phosphorodithioate, wherein the hydrocarbyl groups are from about 4 to 30 carbon atoms. The remaining valence may be satisfied by zinc, a polyalkyleneoxy or a third hydrocarbyl group.

In order to demonstrate the effectiveness of the compositions of this invention, the composition of Example III (prior to ether extraction) was tested in a modified FL–2 test procedure, as described in the June 21, 1948, report of the Coordinating Research Council. This test simulates automobile engine performance. A standard procedure requires the maintenance of a jacket temperature of 95° F. and a crankcase oil temperature of 155° F. at 2,500 r.p.m. and 45 brake horsepower for 40 hours (closely simulating the relatively "cold" engine conditions which are normally experienced in city driving). At the end of each test, the engine is dismantled and the amount of total sludge (rating of 0 to 50, no sludge being 50) and clogging of the rings and oil screen (rating of 0 to 100, no clogging being 0) is determined. The above test was modified by increasing the time and periodically raising the oil sump temperature from 165° F. to 205° F. and the water jacket temperature from 95° F. to 170° F.

Using a Mid-Continent SAE 30 base stock, the exemplary detergent was employed at 4 weight percent concentration; also included in the oil was 10 mM./kg. of zinc O,O-di(alkyl dithiophosphate) (alkyl of from 4 to 6 carbon atoms) and 2 mM./kg. of zinc O,O-di(alkylphenyl) dithiophosphate (alkyl is polypropylene of from 12 to 15 carbon atoms). The run was carried out for 100 hours, and the results were as follows: total sludge: 38.6; percent oil ring clogging: 47; and percent oil screen clogging: 10. With base oil, the engine is usually incapable of any further operation after about 12 hours.

As is evident from the above result, the compositions of this invention provide excellent detergency under severe test conditions, analogous to those occurring in the automobile engine. Moreover, the compositions of this invention are easily obtained from readily available chemicals and are compatible with common additives, e.g., zinc dithiophosphates.

As will be evident to those skilled in the art, various modifications on this invention can be made or followed, in the light of the foregoing disclosure and discussion, without departing from the spirit or scope of the disclosure or from the scope of the following claims.

I claim:

1. A lubricating oil composition having in an amount to provide detergency and dispersancy a composition obtained by contacting at a temperature in the range of 150° to 300° C. an aryl C-nitroso compound of from 6 to 12 carbon atoms, being unsubstituted or substituted with lower alkyl groups (monoloweralkyl)amino or di(loweralkyl)amino groups, with a hydrocarbon terminal olefin of from about 30 to 200 carbon atoms, wherein the mole ratio of said olefin to said nitroso compound is in the range of 1:10 to 2:1.

2. A lubricating oil composition according to claim 1 wherein said hydrocarbon terminal olefin is polyisobutylene and said aryl group is (dimethylamino)phenyl.

3. A lubricating oil composition according to claim 1 wherein said mole ratio of said hydrocarbon terminal olefin to nitroso compound is in the range of 1–2 to 1.

4. A lubricating oil composition having from 20 to 70 weight percent of a composition obtained by contacting at a temperature in the range of 150° to 300° C. an aryl C-nitroso compound of from 6 to 12 carbon atoms, being unsubstituted or substituted with lower alkyl groups (monoloweralkyl)amino or di(loweralkyl)amino groups, with a hydrocarbon terminal olefin of from about 30 to 200 carbon atoms, wherein the mole ratio of said olefin to said nitroso compound is in the range of 1:10 to 2:1.

References Cited

UNITED STATES PATENTS

| | | | |
|---|---|---|---|
| 2,066,173 | 12/1936 | Calcott et al. | 252—51.5 |
| 2,189,788 | 2/1940 | Freeman | 252—51.5 X |
| 2,224,158 | 12/1940 | Marks et al. | 252—51.5 X |
| 2,281,520 | 4/1942 | Fuller | 252—51.5 |
| 2,326,938 | 8/1943 | Fuller et al. | 252—51.5 |
| 3,062,887 | 11/1962 | Levering et al. | 252—51.5 X |

DANIEL E. WYMAN, *Primary Examiner.*

PATRICK P. GARVIN, *Examiner.*